United States Patent [19]

Maples

[11] Patent Number: 4,891,037
[45] Date of Patent: Jan. 2, 1990

[54] CONTINUOUS CHAIN LUBRICATING DEVICE

[76] Inventor: Paul D. Maples, 772 S. Sierra Ave., Solana Beach, Calif. 92075

[21] Appl. No.: 267,933

[22] Filed: Nov. 7, 1988

[51] Int. Cl.[4] .............................................. F16H 57/04
[52] U.S. Cl. ..................................... 474/91; 184/15.1
[58] Field of Search ................... 474/91, 92; 184/15.1, 184/15.3, 18, 90, 88.1; 280/261

[56] References Cited

U.S. PATENT DOCUMENTS

| | | |
|---|---|---|
| 296,440 | 7/1884 | Oliver . |
| 602,000 | 12/1898 | Fay . |
| 603,654 | 3/1898 | Norris . |
| 613,833 | 10/1898 | Baldwin . |
| 648,866 | 6/1900 | Gibford . |
| 1,049,170 | 4/1912 | Thomas . |
| 1,471,583 | 5/1921 | Andersen . |
| 1,584,704 | 3/1924 | Swan . |
| 2,435,120 | 6/1948 | Baker ...................................... 184/15 |
| 2,441,642 | 8/1948 | McDaniel ............................ 91/62.5 |
| 2,847,880 | 9/1958 | Neidig ...................................... 77/55 |
| 3,724,582 | 8/1973 | Wood ................................ 180/33 R |
| 4,194,413 | 4/1980 | Hentze .................................... 74/611 |
| 4,262,783 | 4/1981 | Scarrola et al. ................... 74/866 X |
| 4,505,169 | 3/1985 | Ganoune ........................... 74/866 X |
| 4,578,120 | 3/1986 | Chiarella ........................ 184/15.1 X |
| 4,593,923 | 9/1986 | Thalmann ........................... 280/261 |
| 4,638,690 | 1/1987 | Hattori et al. .............. 364/424.1 X |
| 4,648,290 | 3/1987 | Dunkley et al. ............. 364/424.1 X |
| 4,714,144 | 12/1987 | Speranza ..................... 364/424.1 X |
| 4,732,055 | 3/1988 | Takeno et al. ....................... 74/866 |
| 4,737,915 | 4/1988 | Hosaka ........................ 364/424.1 X |
| 4,774,858 | 10/1988 | Garroing .......................... 74/866 X |
| 4,792,901 | 12/1988 | Mack et al. ...................... 364/424.1 |

Primary Examiner—Thuy M. Bui
Attorney, Agent, or Firm—Charmasson & Holz

[57] ABSTRACT

A split tube containing a lubricant is engaging a bicycle chain. The lubricator tube is carried by the chain during the initial chain operation until the tube end contacts a barrier surface on the chain drive mechanism. The barrier may be the pivoting idler arm, the derailer mechanism, or a portion of the bicycle frame. The device brings the lubricant in intimate contact with the chain allowing the use of semi-solid, liquid, and solid-solvent mixture of lubricants.

14 Claims, 1 Drawing Sheet

CONTINUOUS CHAIN LUBRICATING DEVICE

FIELD OF THE INVENTION

This invention relates to chain lubricators, more specifically to continuous bicycle chain lubrication.

BACKGROUND OF THE INVENTION

The primary objectives of a chain lubricator are to (1) apply lubrication to rubbing surfaces of the chain, (2) avoid application of excess lubrication or foreign material, and (3) be removable when lubrication is not required. The lubricator should be small so that it will not interfere with chain operation. It should also be light weight, rugged in construction, reliable, pleasing in appearance and low in cost. When the lubricator is installed or removed, a minimum of effort is also desirable.

Most of the current bicycle chain lubricators may do one of these objectives well, but other objectives and desires are not fully met. Most commonly, lubrication is accomplished by immersing or spraying a liquid lubricant on the chain. The immersion and/or spraying is sometimes also accompanied by cleaning means (wiping, brushing, etc.) to remove excess lubricant, old lubricant and dirt from the chain. This type of lubricator is commonly hand held, but may also be attached to the bicycle frame, allowing continuous lubrication. An attached device of this type is illustrated by: U.S. Pat. No. 613,833. Separate cleaning means, such as illustrated in U.S. Pat. Nos. 602,000 and 648,866, may also be used in conjunction with this type of lubricator.

A second type of lubricator saturates an absorbent material or sponge With a liquid lubricant and the absorbent material is placed in contact with the chain. The absorbent material may be in contact with a fluid reservoir to replenish liquid lubricant and may also be combined with cleaning brushes, as before. This device may also be hand held, or attached to the bicycle frame for continuous lubrication. Continuous attached lubrication devices are illustrated by U.S. Pat. Nos. 603,654; 4,593,923; and 4,194,413.

All of these prior art continuous chain lubricators are attached or fixed relative to the frame, allowing the chain to run in contact with the lubricant or absorbent material containing the liquid lubricant. Liquid lubricant is always used in order to migrate and lubricate unexposed surfaces, such as the pinned chain connectors.

Solid lubricants for chains are also known, but not in conjunction with continuous lubricators. Solid lubricants may have advantages over liquid lubricants in the area of reduced attraction/retention of dirt, reduced contamination of adjoining unlubricated surfaces and acting as a protective covering (e.g., corrosion protection). However, direct application of solid lubricant to an assembled chain essentially impossible because of the unexposed pinned connections. Whereas the liquid lubricant will migrate to unexposed surfaces by surface tension, a solid lubricant must be directly applied proximate the rubbing surfaces.

Other types of lubricators used to lubricate rope, shafts, cables or wire are known that use solid lubricants and lubricating means adapted to use solid lubricants. However, continuous solid lubricators are not appropriate to chains. Chain lubricant must lubricate the exposed and unexposed (pinned connections) surfaces of the chain. Wire, shaft, rope or cable lubricators lubricate only the exposed surface which directly rubs and contacts pulleys or other interfacing mechanisms.

In addition, other types of lubricators cannot properly function on a chain because the chain location between pulley/sprocket position can vary as a function of chain tension, making contact with the a fixed lubricator unreliable. Examples of shaft, rope, wire or cable lubricators which are not applicable to chain lubrication applications are illustrated in U.S. Pat. Nos. 1,584,704; 1,471,583; 296,440; 2,847,880; 2,441,642; 2,435,120; and 1,049,170.

Applicable prior art continuous attached chain lubricator approaches have many limitations. These limitations are primarily related to the multiplicity of elements and type of lubricant required to accomplish the continuous lubrication function. The multiplicity of elements, weight and space particularly detract from bicycle racing applications, creating added cost, weight and space. The frame attachment and removal means can be particularly cumbersome. Lubricator entry and exit transition sections may be required to guide the chain into and out of the fixed lubricator position. Liquid lubricant also tends to attract dirt as well as drip and contaminate other surfaces if not wiped or cleaned. Cleaning or wiping means consume still further weight, attachment/removal effort, and further reduce reliability.

None of the prior art continuous chain lubricators known to the applicant avoids fixing the lubricator position with respect to the frame or uses other than a liquid lubricant.

What is needed is a simple lubricator, capable of using a solid lubricant and not requiring fixing into position relative to the frame. The unfixed position would allow the lubricator to follow movements of the chain, avoiding transition sections and associated attachment and other hardware.

SUMMARY OF THE INVENTION

The principal and secondary objects of the invention are:

To provide a continuous chain following lubricator;

To provide a lubricator capable of using a solid or liquid lubricant; and

To provide a quick and convenient means to install or remove lubricator.

These and other objects are achieved by a split tube hung on a bicycle chain and containing a lubricant, having an end surface for contacting a reference surface. Lubricator tube is carried by the chain during the initial chain operation until the tube end surface contacts a reference surface on the bicycle chain drive mechanism. Reference surface may be the pivoting idler arm or derailer mechanism, as well as a portion of the bicycle frame. Because of the hanging lubricator design and intimate chain contact achieved, this allows the use of semi-solid, liquid, and solid-solvent mixture of lubricants for this chain lubricant application.

DESCRIPTION OF THE PREFERRED EMBODIMENT

Figure 1:
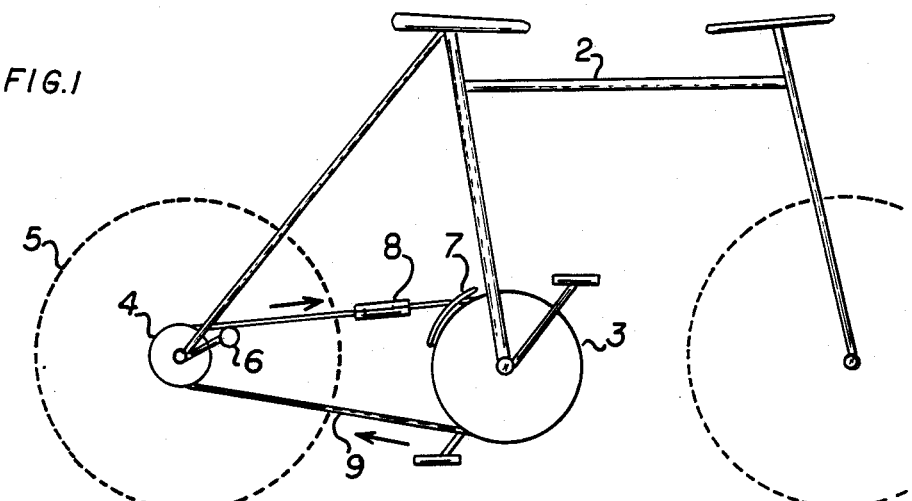
FIG. 1 shows a side view of a lubricator on a bicycle.

FIG. 1 shows the preferred embodiment of the continuous lubricator installed on a bicycle. The bicycle frame 2 supports a crank 3 and sprocket assembly 4 on back wheel 5 (shown dotted for clarity. On modern multi-speed bikes, sprocket assembly 4 includes an idler arm or gear cluster 6 and a front derailer mechanism 7. The split case lubricator 8 is slidably hung from bicycle chain 9 between the idler arm 6 and front derailer 7. The lubricator 8 is free to traverse from the front derailer 7 to the idler arm 6, however, during pedaling of crank 3, the chain 9 tends to pull the lubricator towards the front derailer (as shown by arrows adjacent to the lubricator) until one end of the lubricator acts as a means for stopping traverse motion by contacting the derailer 7, which is generally immobile with respect to the chain. The derailer and idler arm movements with respect to the frame 2 are not adversely impacted due to the ability of the lubricator 8 to traverse out away from these reference surfaces.

Figure 2:
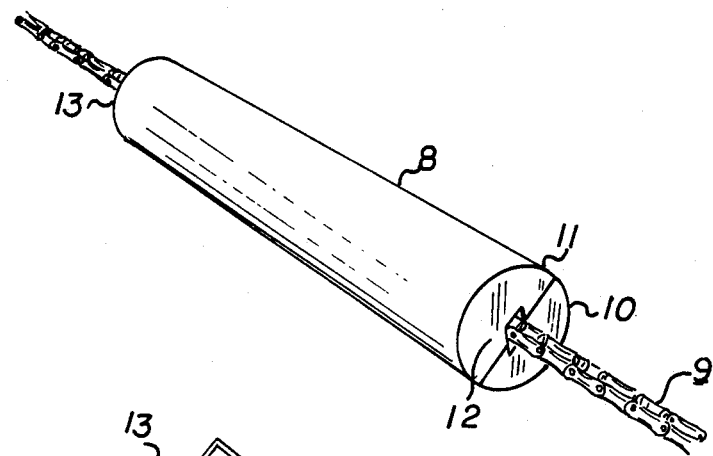
FIG. 2 shows a perspective view of a lubricator on a chain.

FIG. 2 shows the lubricator mounted on a chain 9. The chain 9 may be a pintle type of chain common on bicycles, but may also be a roller type or other type of linked chain. The lubricator 8 is comprised of 2 half sections 10 and 11. The sections form a cylindrical tube with openings at the chain entrance end 12 and chain exit end 13 which allow the chain to pass through. The lubricator 8 is supported by the chain so that any change in tension and resulting change in position of the chain does not affect the lubricator chain interface, since the lubricator follows the chain. The entrance end 12 provides a means to stop transverse motion of the lubricator with respect to the frame by contacting the front derailer (see FIG. 1). The exit end 13 provides a similar means to limit transverse motion in the other direction by contacting the idler arm.

Figure 3:
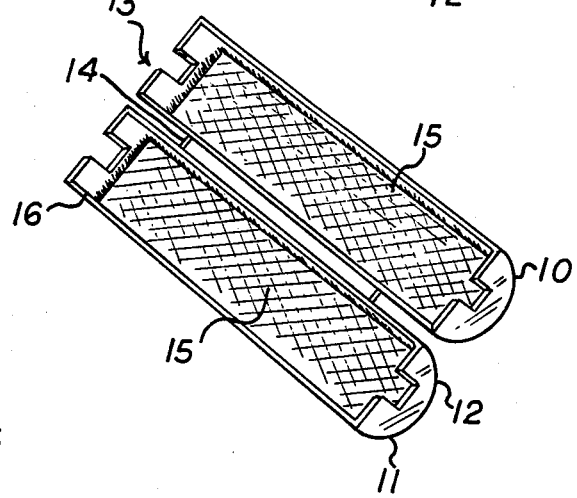
FIG. 3 shows a perspective view of an open section lubricator.

FIG. 3 shows the two half sections 10 and 11 open. Hinges 14 attached section 10 to section 11 to form a split case cYlindrical design, which can be easily removed. An absorbent material 15 is placed inside the sections and saturated with lubricant, or a semi-solid grease can be used. The absorbent material 15 maintains contact with the chain (not shown for clarity) as it passes through the lubricator form the entrance end 12 to the exit end 13. A brush or other cleaning means 16 is provided to wipe excess lubricant.

Lubricant in the preferred embodiment is a mixture of dry lubricant and a solvent, specifically a mixture of up to ten (10) percent paraffin wax and the remainder toluene. This lubricant tends not to retain dirt. Alternate lubricants may include a variety of semi-solid greases or waxes, as well as liquid oils, dispersions of plastics or other solid lubricants in mineral oils, fluorocarbons or alcohols.

By using the above described invention to apply the wax solvent mixture, wax transfer to the chain is significantly increased to the level approximating that of dipping the chain in molten parafin. The extra wax transfer occurs because as the bicycle chain is lubricated while the bicycle is being ridden, the solvent evaporates as the chain rotates allowing for progressive wax buildup the longer the bicycle is ridden. A further advantage of this invention is the potential for cleaning the chain while it is being lubricated.

Further, the invention eliminates much of the messiness of lubricating a bicycle chain with a preferred paraffin wax by conventional methods, which usually entails turning the bicycle up-side-down and wiping the chain with a rag to remove dirt melting, applying and wiping excess lubricant.

Alternate embodiments can provide a second cleaning brush 16 proximate the entrance end to remove dirt prior to contacting the lubricant, or absorbent material saturated with lubricant. The split case may be replaced by a single tubular container having a transverse bore near tbe axis and an access slot for removably attaching the container. Another embodiment could provide rectangular or other shaped container as well as alternate split and bore lines.

While the preferred and some alternate embodiments of the invention have been shown and described, changes and modifications may be made therein within the scope of the appended claims without departing from the spirit and scope of this invention.

What is claimed is:

1. In combination with a power-transmission chain, a lubricating device which comprises:
    a container partially enclosing a lubricant, said container having a transversal bore slidingly engaging the chain;
    wherein said container comprises two mating half sections joined about a plane intersecting said bore; and
    means to impede one direction of movement of the container when the chain is in motion.

2. The device of claim 1, wherein said means to impede comprises a contact surface at one end of said container.

3. The device of claim 2, wherein said contact surface partially encloses said lubricant.

4. The device of claim 1, wherein said chain is a bicycle chain.

5. The device of claim 4, wherein said chain is a pintle chain.

6. The device of claim 1, which also comprise means for cleaning said chain attached to said case.

7. The device of claim 1, wherein said lubricant is a semi-solid wax.

8. The device of claim 1 which also comprises an absorbent material in intimate contact with said lubricant and said chain.

9. The device of claim 1 wherein said lubricant comprises a mixture of a dry lubricant and a solvent.

10. The device of claim 9, wherein said lubricant mixture comprises a paraffin wax and toluene.

11. A chain lubricating device in combination with a chain and means for moving the chain, said device comprising:
    a split case element shaped and dimensioned to slidably hang from said chain, said case element comprised of at least two removable sections;
    means for attaching said sections to each other;
    a lubricant contained within said case in intimate contact with said chain; and
    means for limiting one direction of sliding motion of said case element banging on said chain.

12. The device of claim 11, wherein said chain driving means comprises a foot operated crank and derailer mechanism in intimate contact with said chain.

13. The device of claim 12, wherein said means for limiting sliding motion comprises a contact surface shaped and dimensioned to interface with said derailer mechanism of said chain driving means.

14. The device of claim 11, wherein said means for attaching comprises a latching and hinge attachment of said sections.

* * * * *